US008391173B2

(12) United States Patent
Cudak et al.

(10) Patent No.: US 8,391,173 B2
(45) Date of Patent: Mar. 5, 2013

(54) METHOD AND APPARATUS FOR RADIO RESOURCE ALLOCATION IN AN ORTHOGONAL FREQUENCY DIVISION MULTIPLEXING COMMUNICATION SYSTEM

(75) Inventors: Mark C. Cudak, Rolling Meadows, IL (US); Amitabha Ghosh, Buffalo Grove, IL (US); William J. Hillery, Hoffman Estates, IL (US); Bishwarup Mondal, Oak Park, IL (US); Anup K. Talukdar, Dekalb, IL (US); Eugene Visotsky, Buffalo Grove, IL (US); Frederick W. Vook, Schaumburg, IL (US); Fan Wang, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 395 days.

(21) Appl. No.: 12/776,499

(22) Filed: May 10, 2010

(65) Prior Publication Data
US 2010/0284482 A1 Nov. 11, 2010

Related U.S. Application Data

(60) Provisional application No. 61/177,114, filed on May 11, 2009.

(51) Int. Cl.
*H04W 4/00* (2009.01)
(52) U.S. Cl. .................... 370/252; 370/329; 370/341
(58) Field of Classification Search .................. None
See application file for complete search history.

(56) References Cited

U.S. PATENT DOCUMENTS

| 2008/0013599 | A1* | 1/2008 | Malladi ............... 375/132 |
| 2008/0159417 | A1 | 7/2008 | Yin et al. |
| 2008/0253326 | A1* | 10/2008 | Damnjanovic ........ 370/329 |
| 2009/0073929 | A1* | 3/2009 | Malladi et al. ....... 370/329 |
| 2009/0225714 | A1* | 9/2009 | Kim et al. ............ 370/329 |

OTHER PUBLICATIONS

Cudak, Mark et al.: "Proposed Text of DL PHY for the IEEE 802.16m Amendment", In: IEEE 802.16 Broadband Wireless Access Working Group, Nov. 4, 2008, all pages.
Hamiti, Shkumbin: "IEEE 802.16 System Description Document [Draft}", In: IEEE 802.16 Broadband Wireless Access Working Group, Apr. 10, 2009, all pages.
Patent Cooperation Treaty, International Search Report and Written Opinion of the International Searching Authority for International Application No. PCT/US2010/034289, Dec. 22, 2010, 8 pages.
3GPP TS 36.211 v1.3.2 (Sep. 2007), 3rd Generation Partnership Project; Technical Specification Group Radio Access Network; Evolved Universal Terrestrial Radio Access (E-UTRA); Physical Channels and Modulation (Release 8), Section.6.2.3.

(Continued)

*Primary Examiner* — Chi H. Pham
*Assistant Examiner* — Shick Hom

(57) ABSTRACT

In an OFDM communication system, wherein a frequency bandwidth is divided into multiple Physical Resource Units (PRUs), a Frequency Partitioning Configuration Module (FPCM) is provided that configures a physical layer for use in multiple coverage areas. The FPCM divides the PRUs into a first group, for frequency selective allocations, and a second group, for frequency diverse allocations. The FPCM subdivides each of the two groups into multiple sets of PRUs, maps the sets of PRUs from the first group to consecutive PRUs allocated for contiguous segment allocation (CS-PRUs), and maps the sets of PRUs from the second group to consecutive PRUs allocated for distributed segment allocation (DS-PRUs). The FPCM permutes the DS-PRUs and allocates the CS-PRUs and the permuted DS-PRUs to at least one frequency partition.

18 Claims, 7 Drawing Sheets

OTHER PUBLICATIONS

IEEE WirelessMan 802.16, P802.16Rev2/D9 Jan. 2009, "Part 16: Air Interface for Broadband Wireless Access Systems", Sponsor: LAN/MAN Standards Committee of the IEEE Computer Society and the IEEE Microwave Theory and Techniques Society, copyright 2009 by the IEEE, Section 8.4.6.

3GPP TSG RAN1 #48, R1-071076, "EUTRA Downlink Distributed Multiplexing and Mapping Rules", Motorola, St. Louis, USA, Feb. 12-16, 2007, all pages.

3GPP TSG RAN1#44, R1-060396, "Downlink Localized and Distributed Multiplexing", Motorola, Denver, USA, Feb. 13-Feb. 17, 2006, all pages.

IEEE C802.16m-08/1508r1, "PHY Structure text for the IEEE 802.16m Amendment", IEEE 802.16 Broadband Wireless Access Working Group, Jan. 6, 2009, all pages.

IEEE 802.16m-08/003r5, "The Draft IEEE 802.16m System Description Document", IEEE 802.16 Broadband Wireless Access Working Group, Oct. 3, 2008, all pages.

* cited by examiner

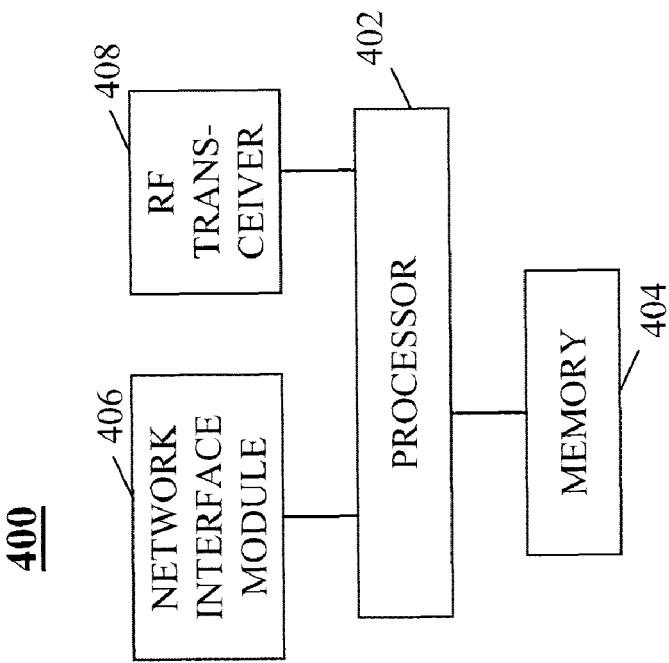
FIG. 4
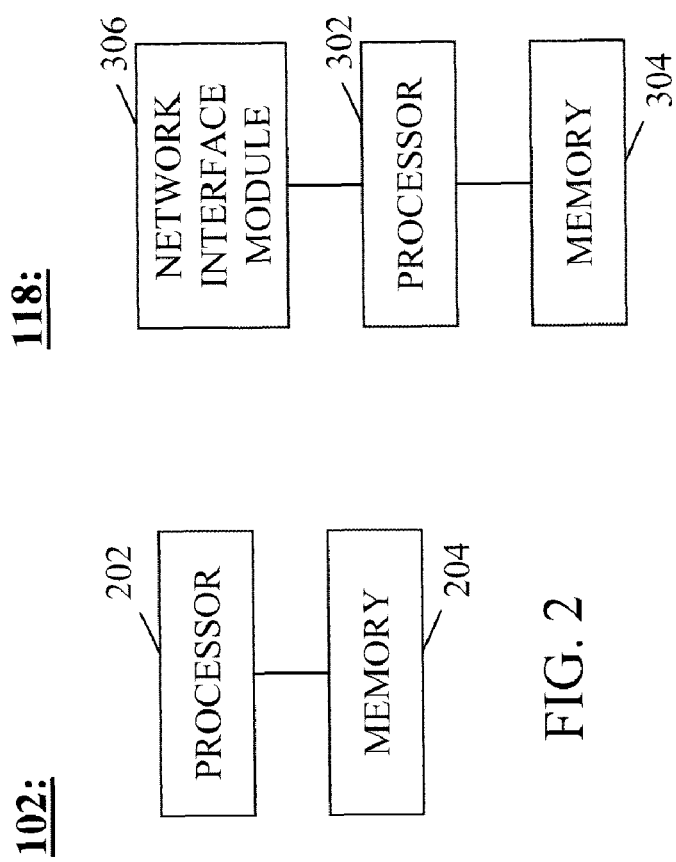
FIG. 3
FIG. 2

METHOD AND APPARATUS FOR RADIO RESOURCE ALLOCATION IN AN ORTHOGONAL FREQUENCY DIVISION MULTIPLEXING COMMUNICATION SYSTEM

CROSS-REFERENCE TO RELATED APPLICATION

This application claims priority from provisional application Ser. No. 61/177,114, entitled "METHOD AND APPARATUS FOR RADIO RESOURCE ALLOCATION IN AN ORTHOGONAL FREQUENCY DIVISION MULTIPLEXING COMMUNICATION SYSTEM," filed May 11, 2009, which is commonly owned and incorporated herein by reference in its entirety.

FIELD OF THE INVENTION

The present invention relates generally to Orthogonal Frequency Division Multiplexing (OFDM) communication systems, and, in particular, to channel quality feedback in an OFDM communication system.

BACKGROUND OF THE INVENTION

Orthogonal Frequency Division Multiple Access (OFDMA) modulation schemes have been proposed for downlink transmissions over an air interface in next generation communication systems, for example, a 3GPP (Third Generation Partnership Project) E-UTRA (Evolved UMTS Terrestrial Radio Access) communication system, a 3GPP2 Phase 2 communication system, and various IEEE (Institute of Electrical and Electronics Engineers) 802.16 communication systems. In an 802.16m OFDMA communication system, a frequency channel, or bandwidth, is split into multiple contiguous Physical Resource Units (PRUs). Each PRU comprises 18 consecutive frequency sub-carriers, which sub-carriers are orthogonal to each other, by six (6) or seven (7) Orthogonal Frequency Division Multiplexing (OFDM) symbols. A grouping of multiple PRUs is known as a sub-band, or cluster, which typically consists of four (4) PRUs. Under the 802.16m standards, a base station (BS) may assign the PRUs to mobile stations (MSs) on a sub-frame basis.

In the 802.16m standards, a logical resource unit (LRU) is the basic logical unit for distributed and localized radio resource allocation. One mapping scheme, known as a logical localized resource unit (LLRU), maps a LRU into multiple contiguous sub-carriers (a contiguous, or localized, PRU). The size of the LLRU equals the size of a PRU, that is, 18 sub-carriers by six or seven OFDM symbols. Localized mapping is used for Frequency Selective Scheduling (FSS), wherein transmission errors are minimized by scheduling a mobile station (MS) for one or more contiguous sub-carriers where the UE is known to have a good downlink channel, based on narrowband channel feedback from the MS. A second mapping scheme, known as a logical distributed resource unit (LDRU), maps a LRU into multiple sub-carriers that are distributed throughout the frequency bandwidth (a non-contiguous, or distributed, PRU). The size of the LDRU also is equal to the size of a PRU, that is, 18 sub-carriers by six or seven OFDM symbols. Distributed mapping is used for Frequency Diverse Scheduling (FDS) and utilizes frequency diversity to achieve a desired throughput level, and thus an LRU may be distributed among multiple sub-carriers without channel feedback or only wideband channel feedback.

Further, the 802.16m standards provide for division of each downlink (DL) and uplink (UL) sub-frame into a number of frequency partitions. Each frequency partition consists of a set of PRUs across the total number of OFDM symbols available in the sub-frame. Each frequency partition then may be allocated to a different coverage area, such as a cell or a sector of a cell. The distribution of frequency partitions among multiple coverage areas is known as fractional frequency reuse (FFR). However, the 802.16m standards fail to specify a specific physical layer structure, that is, a scheme for allocating frequency partitions to the different coverage areas or for mapping the LLRUs and LDRUs to the different frequency partitions/coverage areas.

Therefore, a need exists for method and apparatus for allocating frequency partitions to different coverage areas and maps LLRUs and LDRUs to the different coverage areas.

BRIEF DESCRIPTION OF THE DRAWINGS

FIG. 2 is a block diagram of a mobile station of FIG. 1 in accordance with an embodiment of the present invention.

FIG. 3 is a block diagram of a Frequency Partitioning Configuration Module of FIG. 1 in accordance with an embodiment of the present invention.

FIG. 4 is a block diagram of a base station of FIG. 1 in accordance with an embodiment of the present invention.

Figure 1:
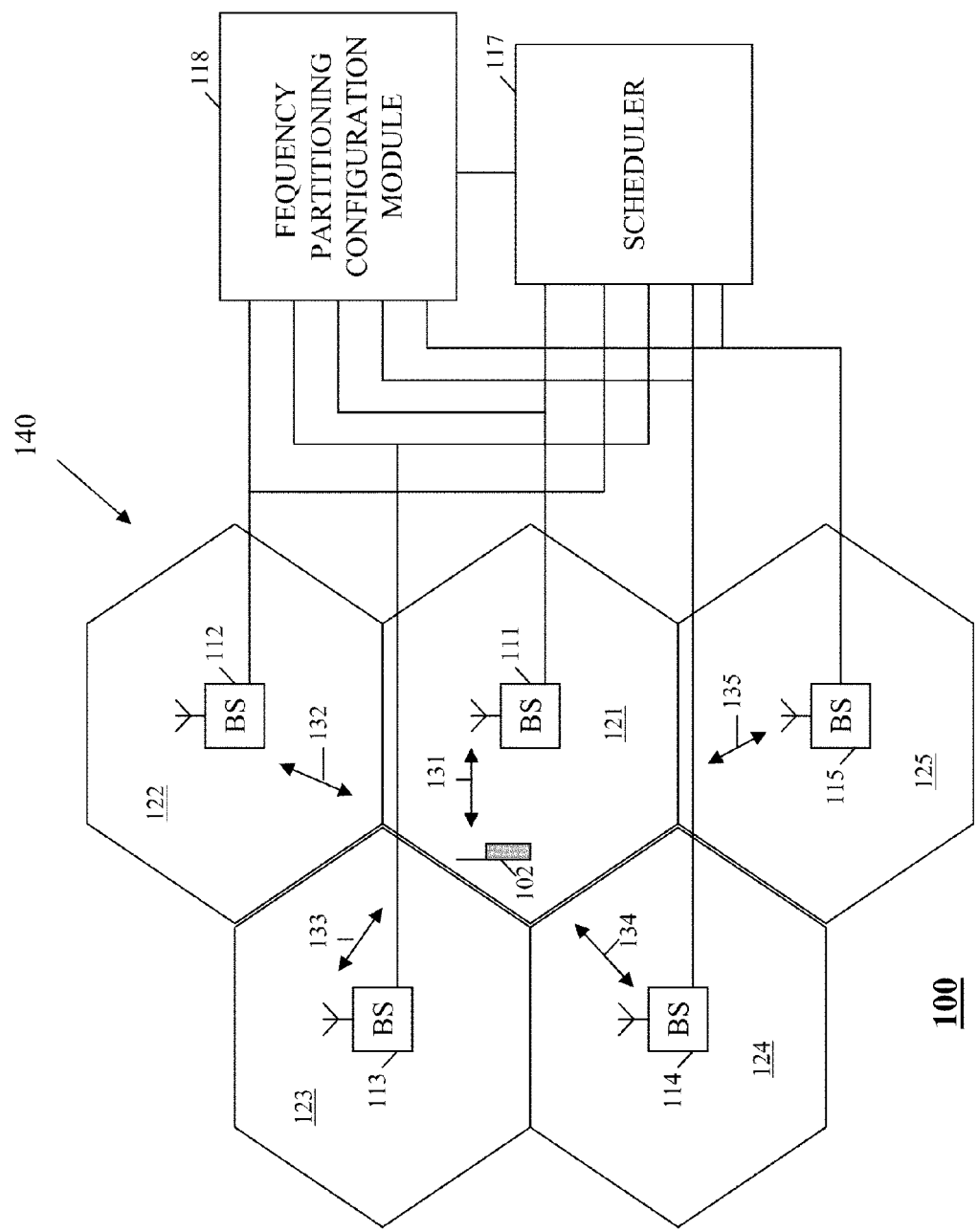
FIG. 1 is a block diagram of a wireless communication system in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus for allocating frequency partitions to different coverage areas and maps logical localized resource units (LLRUs) and logical distributed resource units (LDRUs) to different coverage areas, a Frequency Partitioning Configuration Module (FPCM) is provided that configures a physical layer for use in multiple coverage areas in an Orthogonal Frequency Division Multiplexing (OFDM) communication system, wherein a frequency bandwidth is divided into multiple Physical Resource Units (PRUs). The FPCM divides the PRUs into two groups, wherein a first group of the two groups is available for frequency selective allocations and a second group of the two groups is available for frequency diverse allocations. The FPCM then subdivides each of the two groups into multiple sets of PRUs, maps the sets of PRUs from the first group of PRUs to consecutive PRUs allocated for contiguous segment allocation to produce contiguous segment PRUs (CS-PRUs), and maps the sets of PRUs from the second group of PRUs to consecutive PRUs allocated for distributed segment allocation to produce distributed segment PRUs (DS-PRUs). The FPCM the permutes the distributed segment PRUs to produce permuted distributed segment PRUs and allocates the CS-PRUs and the permuted DS-PRUs to at least one frequency partition.

Generally, an embodiment of the present invention encompasses a method for radio resource allocation in an OFDM communication system, wherein a frequency bandwidth is divided into multiple PRUs. The method includes dividing PRUs into two groups, wherein a first group of the two groups is available for frequency selective allocations and a second group of the two groups is available for frequency diverse allocations, subdividing each of the two groups into multiple sets of PRUs, mapping the sets of PRUs from the first group of PRUs to consecutive PRUs allocated for contiguous segment allocation to produce contiguous segment PRUs (CS-PRUs), and mapping the sets of PRUs from the second group of PRUs to consecutive PRUs allocated for distributed segment allocation to produce distributed segment PRUs (DS-PRUs). The method further includes permuting the distributed segment PRUs to produce permuted distributed segment PRUs and allocating the CS-PRUs and permutted DS-PRUs to at least one frequency partition.

Another embodiment of the present invention encompasses a Frequency Partitioning Configuration Module for configuring a physical layer in an OFDM communication system, wherein a frequency bandwidth is divided into multiple PRUs. The FPCM includes a processor that is configured to divide PRUs into two groups, wherein a first group of the two groups is available for frequency selective allocations and a second group of the two groups is available for frequency diverse allocations, subdivide each of the two groups into multiple sets of PRUs, map the sets of PRUs from the first group of PRUs to consecutive PRUs allocated for contiguous segment allocation to produce contiguous segment PRUs (CS-PRUs), and map the sets of PRUs from the second group of PRUs to consecutive PRUs allocated for distributed segment allocation to produce distributed segment PRUs (DS-PRUs). The processor further is configured to permute the distributed segment PRUs to produce permuted distributed segment PRUs. The FPCM further comprises a network interface for informing other network elements of the CS-PRUs and permutted DS-PRUs.

The present invention may be more fully described with reference to FIGS. 1-8. FIG. 1 is a block diagram of a wireless communication system 100 in accordance with an embodiment of the present invention. Communication system 100 includes a mobile station (MS) 102, such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes a wireless infrastructure having a Radio Access Network (RAN) 140 that provides wireless communication services to MS 102. RAN 140 includes multiple base stations (BSs) 111-115 (five shown), such as a Base Transceiver Station (BTS), a Node B, or an Access Point, that are each in communication with an infrastructure-based scheduler 117 and Frequency Partitioning Configuration Module (FPCM) 118 that further are in communication with each other. In various embodiments of the present invention, each of BSs 111-115 may communicate with FPCM 117 via scheduler 117 or may be able to separately communicate with FPCM 118. Further, each of scheduler 117 and FPCM 118 may be implemented in one or more of: a base station controller, a mobile switching center (MSC), or any other infrastructure-based element that may be communicated with by the BSs. In yet another embodiment of the present invention, each BS 111-115 may implement its own scheduler. Each of BSs 111-115, scheduler 117, and FPCM 118 may be referred to herein as a network element of communication system 100.

Each BS 111-115 provides communications services to mobile stations (MSs) located in a coverage area 121-125 associated with the BS, such as a cell or a sector of a cell, via a respective air interface 131-135. Each air interface 131-135 comprises a downlink (DL) and an uplink UL) that each includes multiple communication channels. Preferably, each DL includes a paging channel, multiple DL control channels including multiple broadcast channels for transmission of system parameters, such as a Primary Broadcast Channel (PBCH) and a Secondary Broadcast Channel (SBCH), and multiple DL traffic channels. Preferably, each UL includes an UL access channel, multiple UL control channels including one or more of a sounding channel and a channel quality feedback channel such as a Channel Quality Information (CQI) channel, and multiple UL traffic channels.

Referring now to FIGS. 2 and 3, each of MS 102 and FPCM 118 includes a respective processor 202, 302, such as one or more microprocessors, microcontrollers, digital signal processors (DSPs), combinations thereof or such other devices known to those having ordinary skill in the art. Each of MS 102 and FPCM 118 further includes a respective one or more memory devices 204, 304 associated with the respective processor, such as random access memory (RAM), dynamic random access memory (DRAM), and/or read only memory (ROM) or equivalents thereof, that store data and programs that may be executed by the respective processor and allow the processor to operate in communication system 100, including storing the equations listed herein so that knowledge of only a few parameters will permit the processors 202, 302 of each of the MS and FPCM to determine the physical layer structure of the air interfaces of communication system 100. FPCM 118 further includes a network interface module 306 that is coupled to processor 302 and that provides an interface with BSs 111-115 and scheduler 117.

FIG. 4 is a block diagram of a BS 400, such as BSs 111-115, in accordance with an embodiment of the present invention. BS 400 includes a processor 402, such as one or more microprocessors, microcontrollers, digital signal processors (DSPs), combinations thereof or such other devices known to those having ordinary skill in the art. BS 400 further includes one or more memory devices 404 associated with the processor, such as random access memory (RAM), dynamic random access memory (DRAM), and/or read only memory (ROM) or equivalents thereof, that store data and programs that may be executed by the respective processor and allow the processor to operate in communication system 100. BS 400 further includes a network interface module 406 that is coupled to processor 402 and that provides an interface with FPCM 118 and scheduler 117, and a radio frequency (RF) transceiver 408, having an RF transmitter and an RF receiver, that is coupled to processor 402 and that provides a wireless interface with MSs served by the BS.

The embodiments of the present invention preferably are implemented within FPCM 118, and more particularly with or in software programs and instructions stored in the respective at least one memory device 304, and executed by the processor 302, of the FPCM. However, one of ordinary skill in the art realizes that the embodiments of the present invention alternatively may be implemented in hardware, for example, integrated circuits (ICs), application specific integrated circuits (ASICs), and the like, such as ASICs implemented in FPCM 118. Based on the present disclosure, one skilled in the art will be readily capable of producing and implementing such software and/or hardware without undo experimentation.

Communication system 100 comprises a wideband packet data communication system that employs an Orthogonal Frequency Division Multiplexing (OFDM) modulation scheme for transmitting data over air interfaces 131-135. Preferably, communication system 100 is an IEEE (Institute of Electrical and Electronics Engineers) 802.16m communication system wherein a radio frequency (RF) channel, or bandwidth, is split into multiple Physical Resource Units (PRUs). Each PRU comprises 18 frequency sub-carriers, which sub-carriers are orthogonal to each other, by six (6) or seven (7) Orthogonal Frequency Division Multiplexing (OFDM) symbols. A grouping of multiple PRUs is known as a sub-band, or cluster, which typically consists of four (4) PRUs. A BS, such as BSs 111-115, may assign the PRUs to mobile stations (MSs), such as MS 102, on a sub-frame basis.

In communication system 100, a logical resource unit (LRU) is the basic logical unit for distributed and localized radio resource allocation. One mapping scheme employed by communication system 100, known as a logical localized resource unit (LLRU, or CRU (contiguous resource unit)), maps a LRU into multiple contiguous sub-carriers (a contiguous, or localized, PRU). The size of the LLRU equals the size of a PRU, that is, 18 sub-carriers by six or seven OFDM symbols. Localized mapping is used for Frequency Selective Scheduling (FSS) by communication system 100, wherein transmission errors are minimized by scheduling a mobile station (MS) for one or more contiguous sub-carriers where the UE is known to have a good downlink channel, based on narrowband channel feedback from the MS. A second mapping scheme employed by communication system 100, known as a logical distributed resource unit (LDRU, or DRU (distributed resource unit)), maps a LRU into multiple sub-carriers that are distributed throughout the frequency bandwidth (a non-contiguous, or distributed, PRU). The size of the LDRU also is equal to the size of a PRU, that is, 18 sub-carriers by six or seven OFDM symbols. Distributed mapping is used for Frequency Diverse Scheduling (FDS) by communication system 100 and utilizes frequency diversity to achieve a desired throughput level, and thus an LRU may be distributed among multiple sub-carriers without channel feedback or only wideband channel feedback.

Further, communication system 100 divides each downlink (DL) and uplink (UL) sub-frame into a number of frequency partitions. Each frequency partition consists of a set of PRUs across the total number of OFDM symbols available in the sub-frame. Each frequency partition then may be allocated to a different coverage area, such as a cell or a sector of a cell. The distribution of frequency partitions among multiple coverage areas is known as fractional frequency reuse (FFR).

In order to provide physical layer wireless resources that may be allocated among multiple coverage areas with optimal utilization and minimal interference, communication system 100 provides a physically layer structure that combines frequency selective resources, frequency diverse resources, and fractional frequency reuse when distributing PRUs among multiple coverage areas.

Figure 5A:
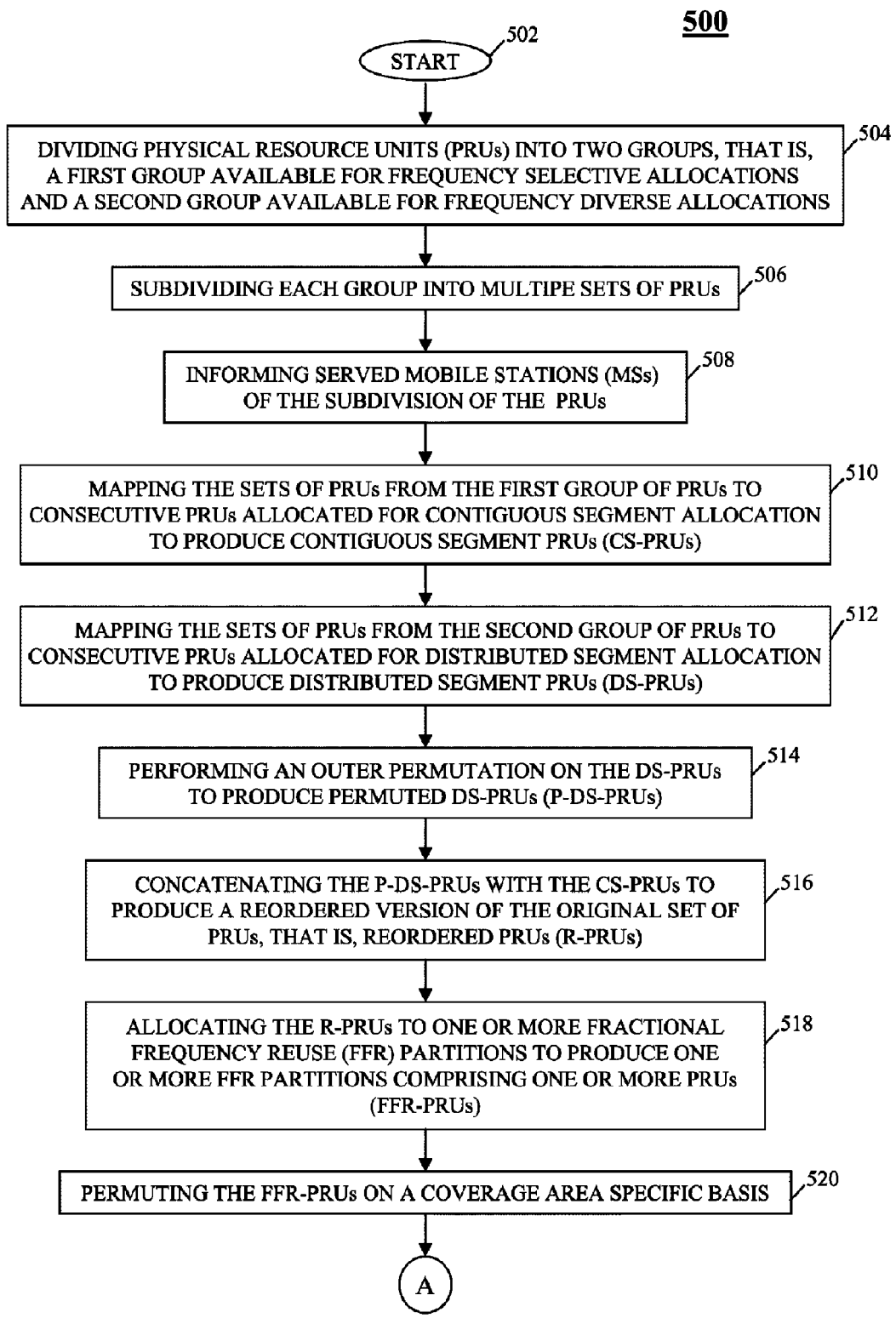
FIG. 5A is a logic flow diagram illustrating a partitioning of physical layer resources and an allocation of the resources among multiple base stations/coverage area by the communication system of FIG. 1 in accordance with an embodiment of the present invention.
Figure 5B:
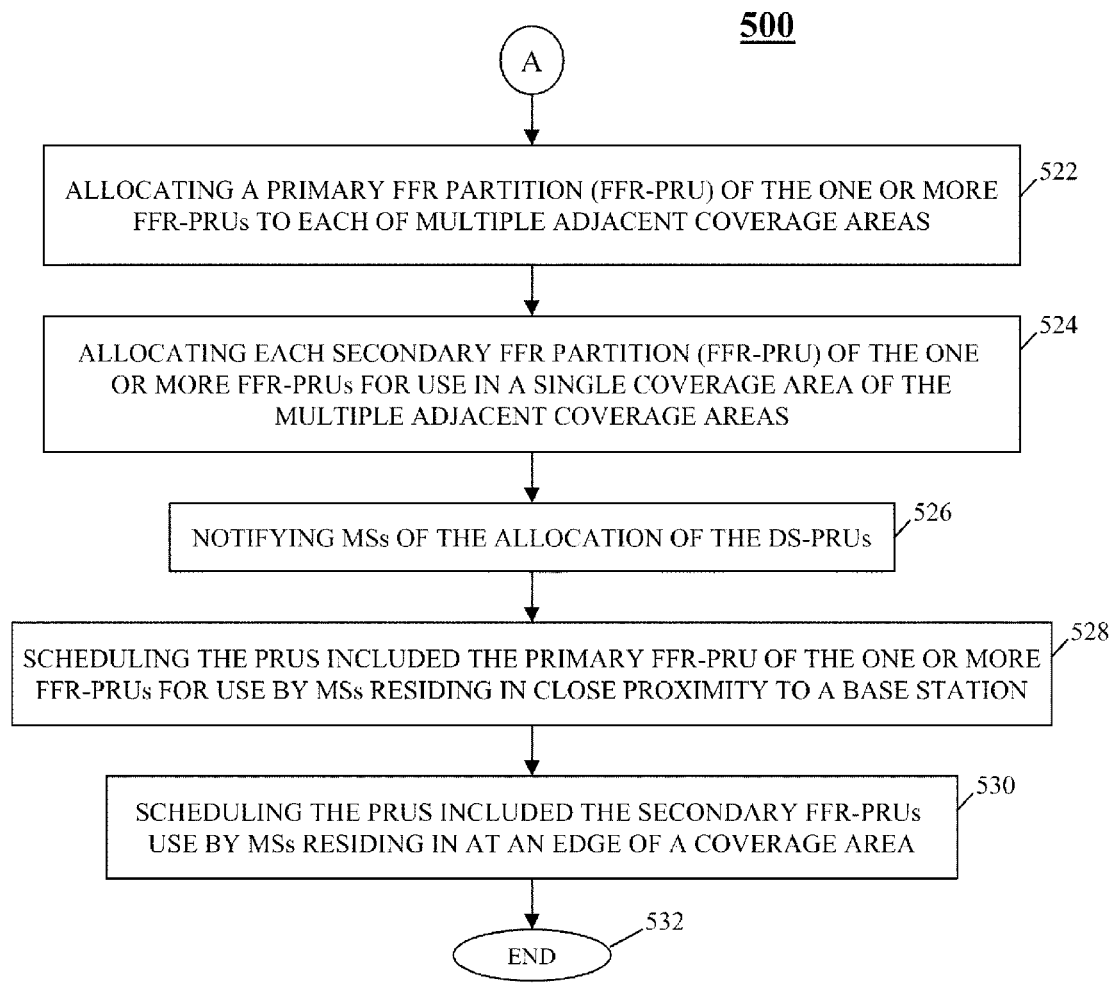
FIG. 5B is a continuation of the logic flow diagram of FIG. 5A illustrating a partitioning of physical layer resources and an allocation of the resources among multiple base stations/coverage area by the communication system of FIG. 1 in accordance with an embodiment of the present invention.

Referring now to FIGS. 5A, 5B, and 6-8, a method is illustrated by which FPCM 118 allocates PRUs among multiple BSs, such as BSs 111-115, and associated coverage areas in accordance with an embodiment of the present invention. More particularly, FIGS. 5A and 5B depict a logic flow diagram 500 that illustrates a partitioning of physical layer resources and an allocation of the resources among multiple base stations/coverage area by communication system 100, and in particular by FPCM 118, in accordance with an embodiment of the present invention. Logic flow diagram 500 begins (502) when FPCM 118 divides (504) the PRUs into two groups, a first group of PRUs that are available for frequency selective allocations to MSs and a second group of PRUs that are available for frequency diverse allocationS to MSs. FPCM 118 further subdivides (506) each group into multiple sets of PRUs, wherein the PRUs of each set of the first group of PRUs are contiguous in frequency to each other.

For example, FPCM 118 may divide the PRUs into N1 and N2 segments, where N1=4 and N2=1, based on a system-wide N2 ratio. Each N1 segment is a set of PRUs from the first group of PRUs and comprises four PRUs. Each N2 segment is a set of PRUs from the second group of PRUs and comprises a single PRU. N1 segments, also referred to herein as Contiguous Segments (CSs), are suitable for frequency selective allocations as they provide a contiguous allocation of PRUs in the frequency bandwidth. N2 segments, also referred to herein as Distributed Segments (DSs), are suitable for frequency diverse allocation and are subject to an outer permutation. Contiguous Segments are not subject to an outer permutation, as described below, and may not be used for DRUs.

FPCM 118 further informs (508) the MSs served by the FPCM, such as MS 102, of the subdivision in a message broadcast via a broadcast channel, such as a PBCH (Primary Broadcast Channel), of each of air interfaces 131-135. The broadcast message includes a 5-bit field Contiguous Segment Count (CSC) field that includes a value that indicates, that is, that may be used to determine, how many segments are allocated to Contiguous Segments. The number of PRUs allocated to Contiguous Segments is $N_{CS}$, where $N_{CS}=4*CSC$. The remainder of the PRUs are allocated to Distributed Segments. The number of PRUs allocated to Distributed Segments is $N_{DS}$ where $N_{DS}=N_{PRU}-N_{CS}$, wherein $N_{PRU}$ represents the number of PRUs in the frequency bandwidth. The mapping of the PBCH is FFS and may be incorporated in the segmentation process.

Figure 6:
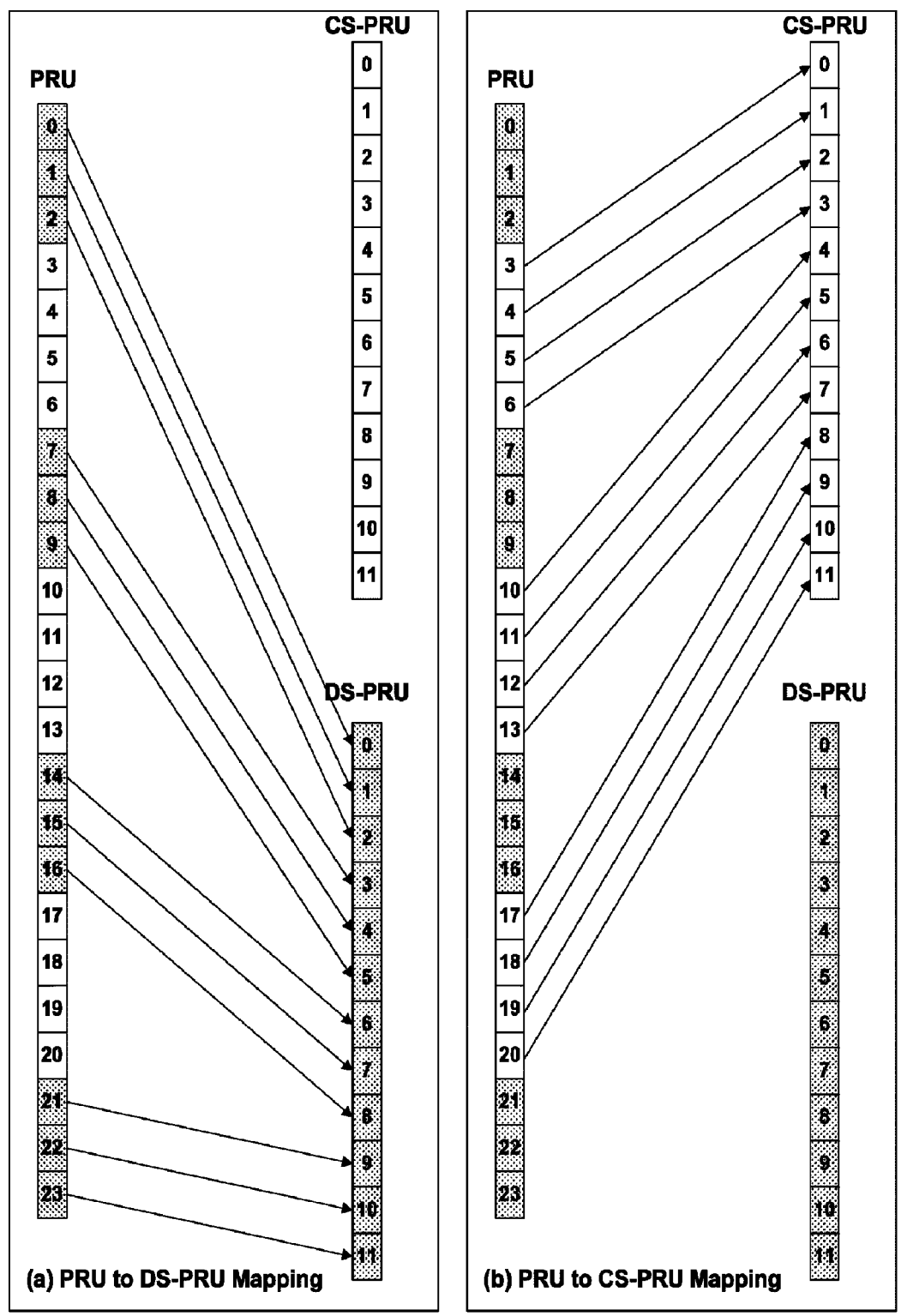
FIG. 6 is a block diagram illustrating a mapping of Physical Resource Units (PRUs) to Contiguous Segment PRUs (CS-PRUs) and to Distributed Segment PRUs (DS-PRUs) by the communication system of FIG. 1 in accordance with an embodiment of the present invention.
Figure 7:
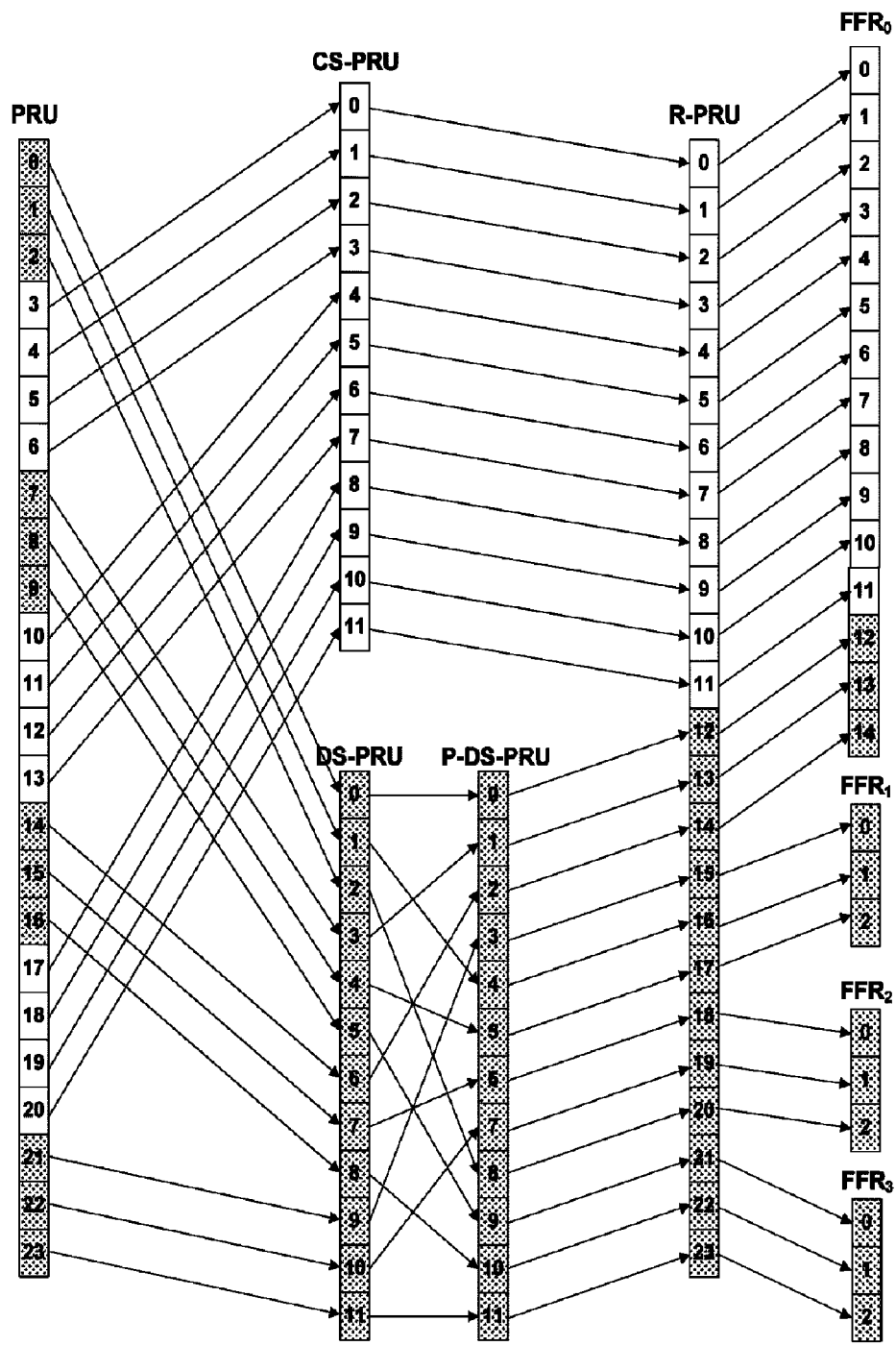
FIG. 7 is a block diagram illustrating a mapping of PRUs to CS-PRUs and to DS-PRUs, of DS-PRUs to Permuted DS-PRUs (P-DS-PRUs), of CS-PRUs and P-DS-PRUs to Re-Ordered PRUs (R-PRUs, and of R-PRUs to Fractional Frequency Reuse (FFR) partitions, by the communication system of FIG. 1 in accordance with an embodiment of the present invention.

For example, and referring now to FIGS. 6 and 7, the frequency bandwidth of communication system 100 is depicted as comprising 24 PRUs, $PRU_0$-$PRU_{23}$, that is, $N_{PRU}$=24. $PRU_0$-$PRU_{23}$ then are segmented and reordered into two groups, that is, contiguous segment PRUs (CS-PRUs) (the N1 segments) and distributed segment PRUs (DS-PRUs) (the N2 segments). As depicted in FIGS. 6 and 7, the set of DS-PRUs are numbered from 0 to ($N_{DS}$−1), and the set of CS-PRUs are numbered 0 to ($N_{CS}$−1). The PRUs to be mapped to CS-PRUs are grouped into sets of four (4) contiguous PRUs, that is, a first CS set comprising $PRU_3$-$PRU_6$, a second CS set comprising $PRU_{10}$-$PRU_{13}$, and a third CS set comprising $PRU_{17}$-$PRU_{20}$.

After subdividing each of the first group of PRUs and the second group of PRUs into multiple sets of PRUs, FPCM 118 maps (510) the sets of PRUs from the first group of PRUs to consecutive PRUs that are allocated for continuous segment allocation to produce CS-PRUs. That is, $PRU_3$-$PRU_6$ are respectively mapped to $CS$-$PRU_0$-$CS$-$PRU_3$, $PRU_{10}$-$PRU_{13}$ are respectively mapped to $CS$-$PRU_4$-$CS$-$PRU_7$, and $PRU_{17}$-$PRU_{20}$ are respectively mapped to $CS$-$PRU_8$-$CS$-$PRU_{11}$.

Intermixed with the CS sets of PRUs are sets of DS PRUs, that is, in-between (frequency-wise) each CS set of PRUs may be a set of one or more DS PRUs, that is, a first DS set comprising $PRU_0$-$PRU_2$, a second DS set comprising $PRU_7$-$PRU_9$, a third DS set comprising $PRU_{14}$-$PRU_{16}$, and a fourth DS set comprising $PRU_{21}$-$PRU_{23}$. FPCM 118 maps (512) each set of PRUs from the second group of PRUs to consecutive PRUs allocated for distributed segment allocation to produce DS-PRUs. That is, $PRU_0$-$PRU_2$ are respectively mapped to $DS$-$PRU_0$-$DS$-$PRU_2$, $PRU_7$-$PRU_9$ are respectively mapped to $DS$-$PRU_3$-$DS$-$PRU_5$, $PRU_{14}$-$PRU_{16}$ are respectively mapped to $DS$-$PRU_6$-$DS$-$PRU_8$, and $PRU_{21}$-$PRU_{23}$ are respectively mapped to $DS$-$PRU_9$-$DS$-$PRU_{11}$. The DS-PRUs are drawn from the set of PRUs to provide $4^{th}$ order frequency diversity while maximizing the number of frequency contiguous CS-PRUs.

That is, referring now to FIG. 6 (which includes FIGS. 6(a) and 6(b)), FIG. 6(a) depicts a mapping of PRUs to DS-PRUs, and FIG. 6(b) depicts a mapping of PRUs to CS-PRUs. The mapping of PRUs to DS-PRUs and CS-PRUs is defined by the following equations (1) and (2):

$$DS\text{-}PRU_j = PRU_i \qquad (1)$$
where $i =$ $$\begin{cases} j & \text{for} \quad j < \left\lceil \frac{N_{DS}}{4} \right\rceil \\ j + 4\left\lfloor \frac{CSC}{3} \right\rfloor & \text{for} \quad \left\lceil \frac{N_{DS}}{4} \right\rceil \le j < \frac{N_{DS}}{2} \\ j + 4\left(CSC - \left\lfloor \frac{CSC}{3} \right\rfloor\right) & \text{for} \quad \frac{N_{DS}}{2} \le j < N_{DS} - \left\lceil \frac{N_{DS}}{4} \right\rceil \\ j + 4CSC & \text{for} \quad j \ge N_{DS} - \left\lceil \frac{N_{DS}}{4} \right\rceil \end{cases}$$

and $CS\text{-}PRU_k = PRU_i \qquad (2)$
where $i =$ $$\begin{cases} k + \left\lceil \frac{N_{DS}}{4} \right\rceil & \text{for} \quad k < 4\left\lfloor \frac{CSC}{3} \right\rfloor \\ k + \frac{N_{DS}}{2} & \text{for} \quad 4\left\lfloor \frac{CSC}{3} \right\rfloor \le k < 4\left(CSC - \left\lfloor \frac{CSC}{3} \right\rfloor\right) \\ k + \left(N_{DS} - \left\lceil \frac{N_{DS}}{4} \right\rceil\right) & \text{for} \quad k \ge 4\left(CSC - \left\lfloor \frac{CSC}{3} \right\rfloor\right) \end{cases}$$

Referring now to FIG. 7, after mapping the PRUs to DS-PRUs and CS-PRUs, FPCM 118 performs (514) an outer permutation on the DS-PRUs to produce Permuted DS-PRUs (P-DS-PRUs). That is, FPCM 118 maps the DS-PRUs to Permuted DS-PRUs (P-DS-PRUs) to insure that frequency diverse PRUs are allocated to each FFR partition. Equation (3) provides a mapping from PRUs to DS-PRUs that guarantees that every four consecutive PRUs will provide $4^{th}$ order frequency diversity:

$$P\text{-}DS\text{-}PRU_j = DS\text{-}PRU_i \qquad (3)$$

where $i = (j \bmod 4)\frac{N_{DS}}{4} + \left\lfloor \frac{j}{4} \right\rfloor$ for $j < N_{DS}$ Following the outer permutation of the DS-PRUs, FPCM 118 concatenates (516) the P-DS-PRUs with the CS-PRUs to produce a reordered version of the original set of PRUs, that is, to form R-PRUs (Re-ordered PRUs). As depicted in FIG. 7, $R$-$PRU_0$-$R$-$PRU_{11}$ correspond to $CS$-$PRU_0$-$CS$-$PRU_{11}$, or $PRU_3$-$PRU_6$, $PRU_{10}$-$PRU_{13}$, and $PRU_{17}$-$PRU_{20}$, respectively, and $R$-$PRU_{12}$-$R$-$PRU_{23}$ correspond to $P$-$DS$-$PRU_0$-$P$-$DS$-$PRU_{11}$, or $PRU_0$, $PRU_7$, $PRU_{14}$, $PRU_{21}$, $PRU_1$, $PRU_8$, $PRU_{15}$, $PRU_{22}$, $PRU_2$, $PRU_9$, $PRU_{16}$, $PRU_{23}$. Thus it can be seen that the R-PRUs provide 4th order transmit diversity for the PRUs from the second group of PRUs, as each PRU from the second group of PRUs now is four PRUs away from an adjacent PRU of the second group of PRUs. The concatenation is captured in the following equation (4), $$R\text{-}PRU = \begin{cases} CS\text{-}PRU_j & \text{for} \quad j < N_{CS} \\ P\text{-}DS\text{-}PRU_{j-N_{CS}} & \text{for} \quad j \ge N_{CS} \end{cases} \qquad (4)$$

FPCM 118 then allocates (518) the R-PRUs to one or more FFR partitions to produce one or more FFR partitions, each comprising one or more PRUs (each FFR partition allocated PRUs may be referred to as a FFR-PRU). By default, at least one partition is present. This is called the primary partition, or $FFR_0$. Optionally, the SBCH may define one or more secondary FFR partitions as well, depicted in FIG. 6 as $FFR_1$-$FFR_3$. Preferably, all secondary partitions are of equal size. FPCM 118 notifies (520) the served MSs of the secondary partitions, when present, by transmitting an SBCH message via each BS served by the FPCM and that includes a 9-bit data field, called the FFR Configuration data field. A first data field of the FFR Configuration data field of the SBCH message, called an FFR Count (FFRC) data field, comprises three bits that define the number of secondary FFR partitions. A second data field of the FFR Configuration data field of the SBCH message, called an FFR Size (FFRS) data field, comprises 6 bits that define the size of all secondary FFR partitions.

The mapping of R-PRUs to the primary FFR permutation is governed by the following equation (5), $$FFR_i\text{-}PRU_j = R\text{-}PRU_k \quad \text{for } i \le FFRC \tag{5}$$

where $$k = \begin{cases} j & \text{for} \quad i = 0 \quad \text{and} \quad j < (N_{PRU} - FFRC \cdot FFRS) \\ j + i \cdot FFRS + (N_{PRU} - FFRC \cdot FFRS) & \text{for} \quad 0 < i \le FFRC \quad \text{and} \quad j < FFRS \end{cases}$$

FFR$_i$-PRUs are mapped to logical LPRUs. All further PRU and subcarrier permutation preferably are constrained to the PRUs within the FFR$_i$-PRUs.

FPCM 118 permutes (520) the FFR$_i$-PRUs on a coverage area 121-125 specific, such as a sector specific, basis. FPCM 118 then allocates (522) the primary FFR partition, FFR$_0$, for use in each of multiple adjacent coverage areas 121-125, such as to each of BSs 111-115. The primary FFR partition, FFR$_0$, is never permuted by a secondary permutation. Scheduler 117, again for example a scheduler included in the BS or in communication with the BS, then may schedule (528), with respect to each BS 111-115, the PRUs included in the primary FFR partition, FFR$_0$, again PRU$_3$-PRU$_6$, PRU$_{10}$-PRU$_{13}$, and PRU$_{17}$-PRU$_{20}$, for use by MSs with a good UL and/or DL with the BS, that is, that can communicate with the BS at a power level that will produce minimal interference in adjacent coverage areas, for example, MSs residing in close proximity to the BS, that is, away from the edge of the coverage area served by the BS. By allocating these PRUs to MSs in close proximity to the BS, inter-coverage area interference among these PRUs from use of the same PRUs in each coverage area is minimized.

The secondary FFR partitions, FFR$_1$-FFR$_3$, have the advantage of frequency diversity with respect to each other, and more particularly 4$^{th}$ order transmit diversity, and therefore may be used at the edges of adjacent coverage areas. Therefore, FPCM 118 allocates (524) each the secondary FFR partitions, that is, FFR$_1$-FFR$_3$, for use in a single coverage area of the multiple adjacent coverage areas 121-125, such as to one of BSs 111-115. For example, FPCM 118 may allocate FFR$_1$ to BS 111, FFR$_2$ to BS 112, and FFR$_3$ to BS 113. However, the BSs allocated FFR$_1$-FFR$_3$ may be adjacent to each other due to the 4$^{th}$ order transmit diversity of the underlying PRUs.

Permutation of the secondary FFR partitions, that is, FFR$_1$-FFR$_3$, is signaled by a 1-bit secondary permutation field in the SBCH. The secondary permutation of FFR$_i$-PRUs is governed by the following equation (6), $$P\text{-}FFR_i\text{-}PRU_j = FFR_i\text{-}PRU_k \quad \text{for } 0 < i \le FFRC \tag{6}$$

where k=f(Cell ID)

The PRU permutation function, f(x), is FFS.

The partition between CRUs and DRUs is done on a sector specific basis. By default, all P-FFR-PRUs are allocated to CRUs.

FPCM 118 notifies (526) the served MSs of the allocation of the DRUs in two step process. A 1-bit field Tone-Base Permutation Enabled bit in the PBCH signals that DRU tone-based permutations are enabled. A 12-bit DRU allocation field in the SBCH signals the allocation of PRUs in the primary and all secondary permutations. The DRU allocation field is sub-divided into a Primary DRU allocation field and a secondary DRU allocation field. The primary DRU allocation field, DRU$_{primary}$, is 6 bits long and signals how many DRUs are allocated in the primary FFR partition. The secondary DRU allocation field, DRU$_{secondary}$, is also 6 bits long and signal how many DRUs are in the secondary FFR partition.

The following equations map the P-FFR-PRUs to FFR-DRUs and FFR-CRUs when DRU tone-based PRUs are enabled:

$$FFR_i \cdot CRU_j = \begin{cases} P \cdot FFR_0 \cdot PRU_j & \text{for} \quad i = 0 \quad \text{and} \quad j < N_{PRU} - FFRC \cdot FFRS - DRU_{primary} \\ P \cdot FFR_i \cdot PRU_j & \text{for} \quad 0 < i < FFRC \quad \text{and} \quad j < FFRS - DRU_{secondary} \end{cases}$$

$$FFR_i \cdot DRU_j = P \cdot FFR_i \cdot PRU_k$$

where $$k = \begin{cases} k + (N_{PRU} - FFRC \cdot FFRS - DRU_{primary}) & \text{for} \quad i = 0 \quad \text{and} \quad j \ge N_{PRU} - FFRC \cdot FFRS - DRU_{primary} \\ k + (FFRS - DRU_{secondary}) & \text{for} \quad 0 < i < FFRC \quad \text{and} \quad j \ge FFRS - DRU_{secondary} \end{cases}$$

Figure 8:
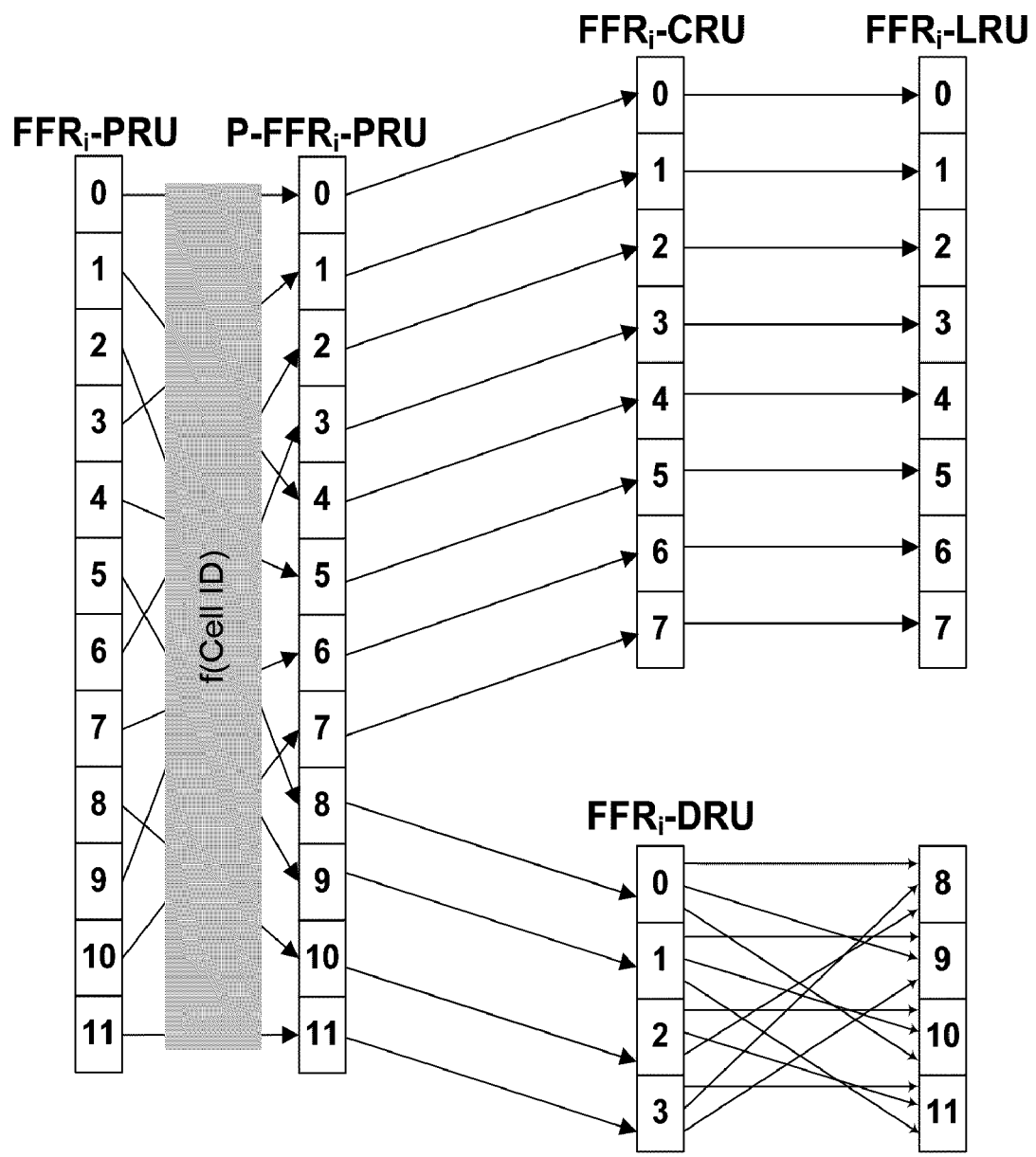
FIG. 8 is a block diagram illustrating a mapping that spreads a distributed resource unit (DRU) across the subcarriers associated with multiple logical resource units (LRUs), and thereby across multiple PRUs at a subcarrier granularity, in accordance with an embodiment of the present invention.

Referring now to FIG. 8, FPCM 118 may further permute the distributed subcarriers within a secondary FFR partition, that is, perform an inner permutation for the DL distributed resource allocations, that is, the distributed subcarriers, within a secondary FFR partition. That is, FIG. 8 illustrating a mapping that spreads a distributed resource unit (DRU) across the subcarriers associated with multiple logical resource units (LRUs), and thereby across multiple PRUs of a secondary FFR partition, at a subcarrier granularity as opposed to at a PRU granularity. The inner permutation spreads the subcarrriers of the LDRU across the whole distributed resource allocations. The granularity of the inner permutation is equal to a pair of subcarriers, or tones. That is, in FIG. 8, FPCM 118 maps each FFR$_i$-CRU to an FFR$_i$-LRU on a one-to-one basis, where the sub-carriers of a FFR$_i$-CRU are mapped to the subcarriers of a corresponding FFR$_i$-LRU. However, to provide further frequency diversity for the DRUs, FPCM 118 may spread sub-carriers of a FFR$_i$-DRU among multiple FFR$_i$-LRUs. That is, as depicted in FIG. 8, for each of FFR$_0$-DRU-FFR$_3$-DRU, the subcarriers of the FFR-DRU are distributed among the subcarriers of FFR$_8$-LRU-FFR$_{11}$-LRU.

Scheduler 117 then may schedule (530) the PRUs included in the secondary FFR partitions, FFR$_1$-FFR$_3$, for use by MSs with worse UL and/or DL communications with the BS than the MSs scheduled for use of the primary FFR partition, for example, for use by MSs at a coverage area edge, as these PRUs may interfere minimally with PRUs used at an edge of an adjacent coverage area due to their transmit, or frequency, diversity. Logic flow 500 then ends (532).

By having an FPCM 118 that combines frequency selective resources, frequency diverse resources, and fractional frequency reuse when distributing PRUs among multiple coverage areas, an OFDM communication system 100 is provided that allocates physical layer wireless resources among multiple coverage areas with optimal utilization and minimal interference. FPCM 118 assembles CS-PRUs that may, as a group, be allocated to each of multiple adjacent coverage areas for use by geographically near-in MSs and further assembles DS-PRUs that have $4^{th}$ order transmit diversity and thereby minimally interfere with each other and that may be allocated to single coverage areas of the multiple adjacent coverage areas for use by more geographically remote, such as edge, MSs.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for radio resource allocation in an Orthogonal Frequency Division Multiplexing communication system, wherein a frequency bandwidth is divided into a plurality of Physical Resource Units (PRUs), the method comprising:
    dividing PRUs into two groups, wherein a first group of the two groups is available for frequency selective allocations and a second group of the two groups is available for frequency diverse allocations;
    subdividing each of the two groups into multiple sets of PRUs;
    mapping the sets of PRUs from the first group of PRUs to consecutive PRUs allocated for contiguous segment allocation to produce contiguous segment PRUs (CS-PRUs);
    mapping the sets of PRUs from the second group of PRUs to consecutive PRUs allocated for distributed segment allocation to produce distributed segment PRUs (DS-PRUs);
    permuting the DS-PRUs to produce permuted DS-PRUs; and
    allocating the CS-PRUs and the permuted DS-PRUs to at least one frequency partition and wherein the CS-PRU and the permuted DS-PRU are concatenated.

2. The method of claim 1, further comprising allocating the CS-PRUs and the permuted DS-PRUs to one or more fractional frequency reuse (FFR) partitions to produce one or more FFR partitions, each comprising one or more PRUs.

3. The method of claim 2, further comprising notifying mobile stations of the one or more FFR partitions via a downlink broadcast channel.

4. The method of claim 3, wherein notifying mobile stations of the one or more FFR partitions comprises conveying a downlink broadcast channel message comprising an FFR configuration field.

5. The method of claim 4, wherein the FFR configuration field comprises a first data field that defines a number of FFR partitions and a second data field that defines the size of all FFR partitions.

6. The method of claim 4, further comprising permuting distributed subcarriers within an FFR partition.

7. The method of claim 2, further comprising permuting the one or more FFR partitions on a coverage area specific basis.

8. The method of claim 7, further comprising allocating a primary FFR partition of the one or more FFR partitions for use in each of a plurality of adjacent coverage areas.

9. The method of claim 8, further comprising allocating a plurality of secondary FFR partitions of the one or more FFR partitions for use in a single coverage area of the plurality of adjacent coverage areas.

10. The method of claim 1, wherein the permuted DS-PRUs have $4^{th}$ order transmit diversity.

11. A Frequency Partitioning Configuration Module for configuring a physical layer in an Orthogonal Frequency Division Multiplexing communication system, wherein a frequency bandwidth is divided into a plurality of Physical Resource Units (PRUs), the Frequency Partitioning Configuration Module comprising:
    a processor that is configured to:
        divide PRUs into two groups, wherein a first group of the two groups is available for frequency selective allocations and a second group of the two groups is available for frequency diverse allocations;
        subdivide each of the two groups into multiple sets of PRUs;
        map the sets of PRUs from the first group of PRUs to consecutive PRUs allocated for contiguous segment allocation to produce contiguous segment PRUs (CS-PRUs);
        map the sets of PRUs from the second group of PRUs to consecutive PRUs allocated for distributed segment allocation to produce distributed segment PRUs (DS-PRUs); and
        permute the DS-PRUs to produce permuted DS-PRUs;
        allocate the CS-PRUs and the permuted DS-PRUs to a frequency partition wherein the CS-PRUs and the permuted DS-PRUs are concatenated; and
    a network interface for informing other network elements of the CS-PRUs and permuted DS-PRUs.

12. The Frequency Partitioning Configuration Module of claim 11, wherein the permuted DS-PRUs have $4^{th}$ order transmit diversity.

13. The Frequency Partitioning Configuration Module of claim 11, wherein the processor is configured to allocate the CS-PRUs and the permuted DS-PRUs to one or more fractional frequency reuse (FFR) partitions to produce one or more FFR partitions, each comprising one or more PRUs.

14. The Frequency Partitioning Configuration Module of claim 13, wherein the processor is configured to permute the one or more FFR partitions on a coverage area specific basis.

15. The Frequency Partitioning Configuration Module of claim 14, wherein the processor is configured to allocate a primary FFR partition of the one or more FFR partitions for use in each of a plurality of adjacent coverage areas.

16. The Frequency Partitioning Configuration Module of claim 15, wherein the processor is configured to allocate a plurality of secondary FFR partitions of the one or more FFR partitions for use in a single coverage area of the plurality of adjacent coverage areas.

17. The Frequency Partitioning Configuration Module of claim 13, wherein the processor is configured to notify mobile stations of the one or more FFR partitions via a downlink broadcast channel.

18. The Frequency Partitioning Configuration Module of claim 11, wherein the processor is configured to convey a Contiguous Segment Count that includes a value that indicates how many segments are allocated to Contiguous Segments.

* * * * *